United States Patent [19]

Deason et al.

[11] Patent Number: 5,016,951
[45] Date of Patent: May 21, 1991

[54] FIBER OPTIC DIFFRACTION GRATING MAKER

[75] Inventors: Vance A. Deason; Michael B. Ward, Idaho Falls, both of Id.

[73] Assignee: The United States of America as represented by the United States Department of Energy, Washington, D.C.

[21] Appl. No.: 388,870

[22] Filed: Aug. 3, 1989

[51] Int. Cl.⁵ .............................................. G03H 1/10
[52] U.S. Cl. ...................................... 350/3.67; 430/1
[58] Field of Search ................. 430/321, 454, 394, 22, 430/1, 2; 350/162.17, 3.72, 96.1, 35.5, 96.19, 3.67, 3.83

[56] References Cited

U.S. PATENT DOCUMENTS 4,215,924  8/1980  Matsumoto ...................... 350/96.19
4,402,571  9/1983  Cowan et al. .................. 350/162.17

Primary Examiner—Charles L. Bowers, Jr.
Assistant Examiner—J. Weddington
Attorney, Agent, or Firm—Helen S. Cordell; John M. Albrecht; William R. Moser

[57] ABSTRACT

A compact and portable diffraction grating maker comprised of a laser beam, optical and fiber optics devices coupling the beam to one or more evanescent beam splitters, and collimating lenses or mirrors directing the split beam at an appropriate photosensitive material. The collimating optics, the output ends of the fiber optic coupler and the photosensitive plate holder are all mounted on an articulated framework so that the angle of intersection of the beams can be altered at will without disturbing the spatial filter, collimation or beam quality, and assuring that the beams will always intersect at the position of the plate.

12 Claims, 3 Drawing Sheets

FIBER OPTIC DIFFRACTION GRATING MAKER

CONTRACTUAL ORIGIN OF THE INVENTION

The United States Government has rights in this invention pursuant to Contract No. DE-AC07-76ID01570 between the U.S. Department of Energy and EG&G Idaho, Inc.

BACKGROUND OF THE INVENTION

This invention relates to a device for the manufacture of diffraction gratings, and more particularly to a device which combines laser beam and fiber optic technology with a flexible mechanical design to facilitate the production of high quality holographic diffraction gratings.

A diffraction grating can be used to cause an incident light beam to be deflected and dispersed according to the well known principles of diffraction and interference. These gratings have wide usage in modern scientific devices such as monochrometers, spectrometers and lasers, and, in addition, mass-produced grating replicas which are selected for their beauty and novelty are found in art, advertising, and displays.

The manufacture of diffraction gratings using the holographic exposure method is well known in the prior art. A photographically sensitive material known as photo-resist is coated on a substrate (the grating blank) and located in a position at which two coherent beams of light intersect to create a three dimensional array of light and dark regions known as interference fringes. After exposure and development using certain etching chemicals, the pattern of regularly spaced bars and furrows on the grating surface will be directly related to the shape and intensity of the exposing interference fringes.

The production of interference fringes requires two coherent beams of light which are usually produced as secondary beams by the separation of a primary beam of coherent light from a suitable source such as a laser. In the prior art this requires the use of a complex assemblage of lasers, spatial filters, beam splitters and mirrors precisely located and oriented so as to create beams of the proper size and quality. Generally, one sets up and aligns the optics for one particular type of grating, and because maintaining alignment of the various components is difficult, if any changes are required the apparatus must be largely rebuilt.

Problems of alignment and realignment which are incurred in the prior art are especially difficult when producing specialized gratings such as crossed-line gratings, dual frequency gratings and holographic optical elements. A crossed-line grating is one that has furrows along both orthogonal x and y directions, and it is produced by exposing the grating blank and then rotating it 90° and exposing it again. Precise alignment is essential.

A dual frequency grating is produced by superimposing two different diffraction gratings of slightly different groove spacing, with one frequency being slightly compressed or expanded in relation to the other. The process is tedious, requiring two exposures at different beam angles without disturbing the spatial filtering, collimation or beam quality.

Holographic optical elements (HOE) often require the use of beams with other than plane wave fronts to obtain lensing effects. One such element has a groove pattern consisting of concentric circles, resulting from exposure by one plane wave and one spherical wave. When light strikes such a groove pattern it will be affected much as if it had struck a lens, but the HOE is only a few microns thick, and thus provides significant weight savings compared to a lens. Considerable care must be taken to properly align the optical components.

It is therefore a primary object of this invention to provide an improved apparatus for the manufacture of diffraction gratings.

In the accomplishment of the foregoing object, it is another important object of this invention to provide an apparatus which is compact, portable, and permits flexibility in alignment.

It is another important object of this invention to provide an apparatus which is convenient to use for the manufacture of specialized gratings such as crossed-line gratings, dual frequency gratings and holographic optical elements.

Additional objects, advantages and novel features of the invention will become apparent to those skilled in the art upon examination of the following and by practice of the invention.

SUMMARY OF THE INVENTION

To achieve the foregoing and other objects, this invention comprises a novel improved compact and portable diffraction grating maker. The improved grating maker is comprised of a laser beam, optical and fiber optics devices coupling the beam to one or more evanescent beam splitters, and collimating lenses or mirrors directing the split beam at an appropriate photosensitive material. The collimating optics, the output ends of the fiber optic coupler and the photosensitive plate holder are all mounted on an articulated framework so that the angle of intersection of the beams can be altered at will without disturbing the spatial filter, collimation or beam quality, and assuring that the beams will always intersect at the position of the plate.

BRIEF DESCRIPTION OF THE DRAWINGS

The present invention is illustrated in the accompanying drawings where.

DETAILED DESCRIPTION OF THE INVENTION

Figure 1:
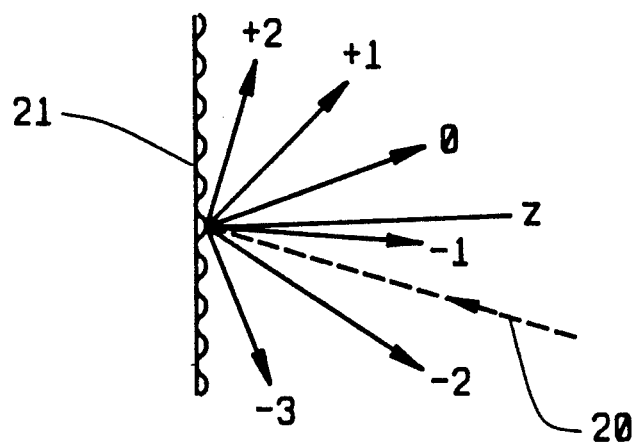
FIG. 1 shows the basic function of a diffraction grating, that is, dividing an incident beam into a number of diffracted beams.

Diffraction gratings are used to disperse the frequency components in an incident light beam into a spectrum. The exit angle is a function of the beam incident angle and its wavelength. As depicted in FIG. 1, for a laser with a single wavelength of emission, the incident beam 20 is simply redirected by the reflection grating 21 into new beams at fixed angles. The multiple beams generated are called diffraction orders. The zero order 0 is the "normal" reflection, where the angle of incidence equals the angle of reflection. The various output diffraction orders are designated ±1,±2, etc. Similar effects occur with transmission gratings.

Figure 2:
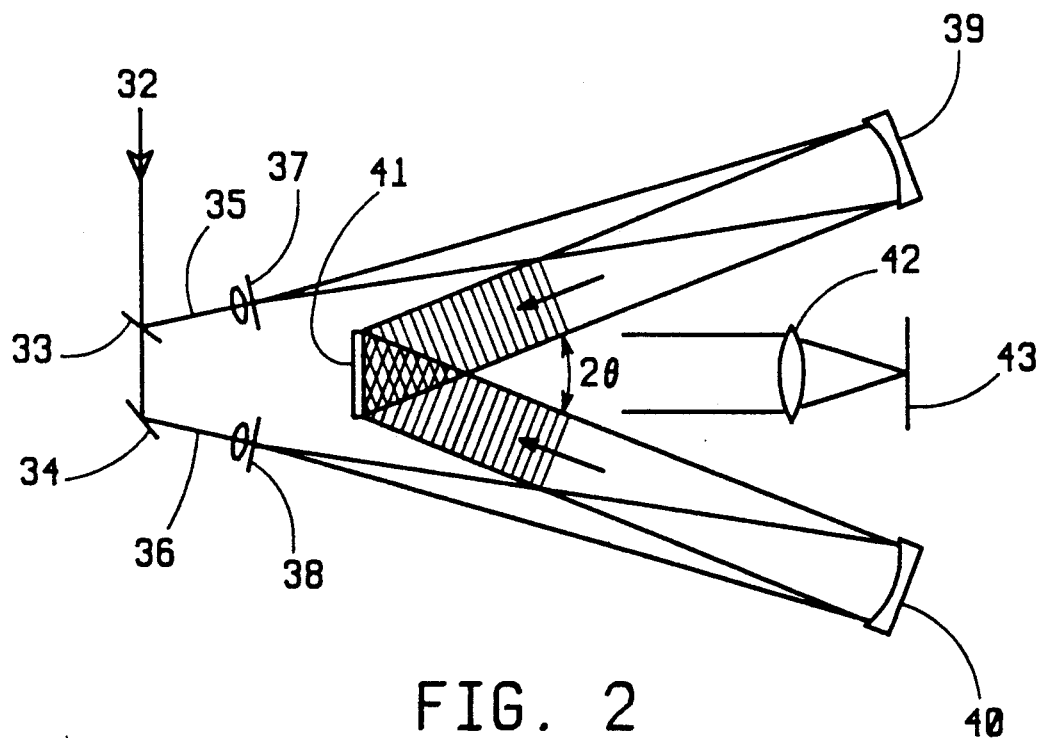
FIG. 2 is a schematic diagram of the prior art method of manufacture of holographic diffraction gratings.

The usual apparatus for the manufacture of holographic diffraction gratings is depicted in FIG. 2. An incident beam 32, which may be a laser beam, is split into two beams by a beam splitter 33 and mirror 34, producing mutually coherent beams 35 and 36.

Spatial filters 37 and 38 serve to focus and filter beams 35 and 36 respectively, reducing each beam to its $TEM_{00}$ mode, and removing any intensity variations across the beam. The filtered beams 35 and 36 are then reflected by parabolic mirrors 39 and 40 to expose the photosensitive plate 41.

The angle between beams 35 and 36 reflected from mirrors 39 and 40 is set coarsely to conform to the following formula:

$$\sin\theta = F\lambda/2 \qquad (1)$$

where $\theta$ is the half angle between the beams, F is the spatial frequency of the desired grating in lines or grooves per mm, and $\lambda$ is the wavelength of the light source in mm.

Once coarsely aligned, one method for fine adjustment is to insert in place of the photosensitive plate 41 a commercial reflective diffraction grating which has a groove spacing exactly twice that which is desired (i.e. spatial frequency half that desired). Beams 35 and 36 will interact with the reference grating and generate two or more diffracted beams.

The zero order beam generated by incident beam 35 corresponds to the normally reflected beam, and will exit the grating more or less coincident with but counterpropagating relative to beam 36. Also produced are two first order beams +1 from beam 35 and −1 from beam 36. These first order beams will interfere, with the interference pattern being more complex the further the beam angles deviate from the ideal or the more aberrations which the beams have due to misalignment or other defects in the optical system.

As the angles of incidence of beams 35 and 36 are adjusted and approach proper alignment the +1 and −1 diffraction orders are converged by lens 42 to two bright spots on screen 43. Adjustment is achieved when the two bright spots are superimposed. Removal of lens 42 will reveal an interference pattern which should be made as coarse as possible for ideal alignment.

One can now produce a diffraction grating having exactly twice the number of grooves per millimeter as the reference grating. This is accomplished by positioning a photosensitive material such as a photographic emulsion or a photoresist in place of the reference grating. The laser is shuttered and the recording material exposed for an appropriate time.

If the arrangement of laser, beam splitter, spatial filters, and mirrors depicted in FIG. 2 is ad hoc, setting up and aligning the optics to produce a desired grating is onerous. If the components must be rearranged for multiple exposures as required for specialized gratings the apparatus must be largely rebuilt.

Figure 3:
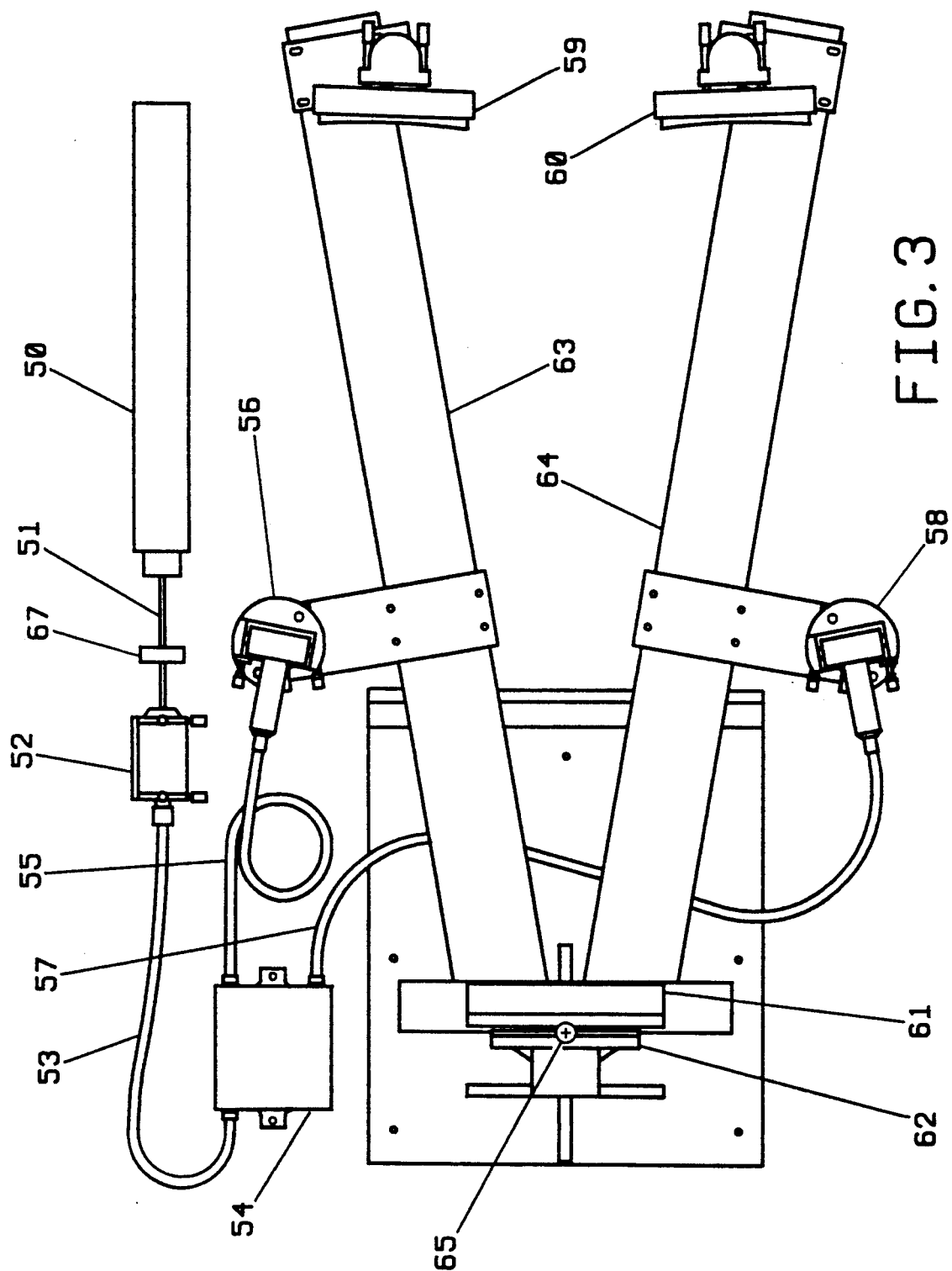
FIG. 3 is a schematic diagram of the preferred embodiment of the present invention, showing collimated mirrors directing mutually coherent beams to create interference fringes.

FIG. 3 is a schematic diagram of the preferred embodiment of the present invention. A laser 50 directs a laser beam 51 to a laser-to-fiber optic coupler 52, and the beam emerges through single mode polarization maintaining optical fiber 53. The signal is then split by an evanescent wave fiber optic beam splitter 54 (also called a coupler) and the resulting two beams are routed respectively through optical fiber 55 to fiber mount 56 and through optical fiber 57 to fiber mount 58.

The output end of optical fiber 55 is mounted on fiber mount 56 so as to direct its output light beam at a collimating mirror 59, and the output end of optical fiber 57 is mounted on fiber mount 58 so as to direct its output light beam at a collimating mirror 60. Collimating mirrors 59 and 60 direct the collimated beams through a mask 61 to intersect in the location of a photosensitive plate holder 62, where interference fringes result and expose the photographic plate.

Fiber mount 56 and collimating mirror 59 are rigidly fixed relative to one another on optical rail 63, and fiber mount 58 and collimating mirror 60 are rigidly fixed relative to one another on optical rail 64. Optical rails 63 and 64 rotate in a plane about a common axis, designated in FIG. 2 as a pivot pin 65, which serves as a hinge and is located directly below plate holder 62. Photosensitive plate holder 62 is positioned so that the plane of the plate is perpendicular to the plane defined by the optical rails 63 and 64, and intersects that plane at pivot pin 65.

In the preferred embodiment, the laser 50 is a Lexel Model 95 4 watt Argon ion laser; any laser beam of adequate power, polarization, wavelength and coherence to permit exposure of the photosensitive material may be used. Using fiber optics, the laser 50 may be mounted remotely, using a fiber optic link (not shown). Mounting the laser 50 remotely will facilitate the use of a more powerful laser, if that is necessary in a particular application. Also, removing the laser 50 from the optical table may improve the product grating by eliminating vibration due to laser coolant flow.

Shutter 67 lies between the output port of laser 50 and laser-to-fiber optic coupler 52; the shutter 67 is used to control the exposure of the photosensitive plate 62 to the laser light.

Laser-to-fiber optic coupler 52 serves to focus the output beam of the laser 50 down to the 5 micrometer spot needed to enter optical fiber 53 efficiently. In combination fiber 53 and laser-to-fiber coupler 52 perform a spatial filtering function which was provided in the prior art by spatial filters 37 and 38 depicted in FIG. 2. In the present invention, since the single mode fiber 53 has a core only 5 micrometer in diameter, only the $TEM_{00}$ mode is captured by the fiber 53 and transmitted along its length. Thus, the beam entering fiber 53 has fewer transverse intensity variations and is therefore very clean.

Fiber optic beam splitter 54 has a 3 dB (50/50) split and its function is to distribute the beam power equally between two polarization maintaining, single optical fibers 55 and 57. In doing so, the device does not distort the beam optical wavefront excessively, and does not disturb the polarization of the output at fiber mounts 56 and 58.

Beam splitter 54 is variable which permits the adjustment of the relative intensity of the output beams. This is useful since different photosensitive materials may require different wavelengths for proper exposure. For example, photographic or silver based materials have good sensitivity at the 514 nm laser line, while photoresist materials require exposure more in the blue end of the spectrum (for example, the 488 nm line of the Argon Ion Laser).

In the preferred embodiment, collimating mirrors 59 and 60 are off-axis paraboloid mirrors with a diameter of 6 inches and focal length of 25 inches. The optical axis of the paraboloid is about 3 inches from the edge of the mirror. The diameters and focal length of collimating mirrors 59 and 60 must be chosen to satisfy the requirements of the final collimated beam diameter. The use of an off-axis paraboloid eliminates certain wavefront distortions (aberrations) which are produced by the more commonly used on-axis parabolic or spherical collimating mirrors.

Laser light exits the output end of fiber 55 at fiber mount 56, and the output end of fiber 57 at fiber mount 58 in a very clean wavefront due to the spatial filtering properties and the single mode nature of the optical fiber. The light expands at an angle determined by the Numerical Aperture of the fiber (NA=0.1 in the preferred embodiment). The output ends of fibers 55 and 57 must lie at the focal points of collimating mirrors 59 and 60 respectively. In reflecting from collimating mirrors 59 and 60, light is both collimated (given a plane wavefront which implies that it is neither diverging nor converging) and redirected towards the plate holder 62.

As noted above, the relationships between optical rails 63 and 64, plate holder 62, and collimating mirrors 59 and 60 are fixed, except that rails 63 and 64 are rotatable about a common axis. Pivot pin 65 serves as an axis for rails 63 and 64, so that if optical rails 63 and 64 are adjusted to any relative angle, the beams emanating from collimating mirrors 59 and 60 will always intersect at the position of the photosensitive plate holder 62.

Plate holder 62 can be rotated so as to permit exposure of the grating with grooves at arbitrary angles relative to the plate edge. Mask 61 in front of the plate holder permits generation of crossed-line gratings, and dual frequency gratings by multiple exposures.

The present invention may be used to make holographic optical elements by, for example, replacing one of the collimating mirrors 59 and 60 with a plane or flat mirror. The photosensitive plate will then be exposed by one plane wave and one spherical wave, resulting in a groove pattern of concentric circles.

Figure 4:
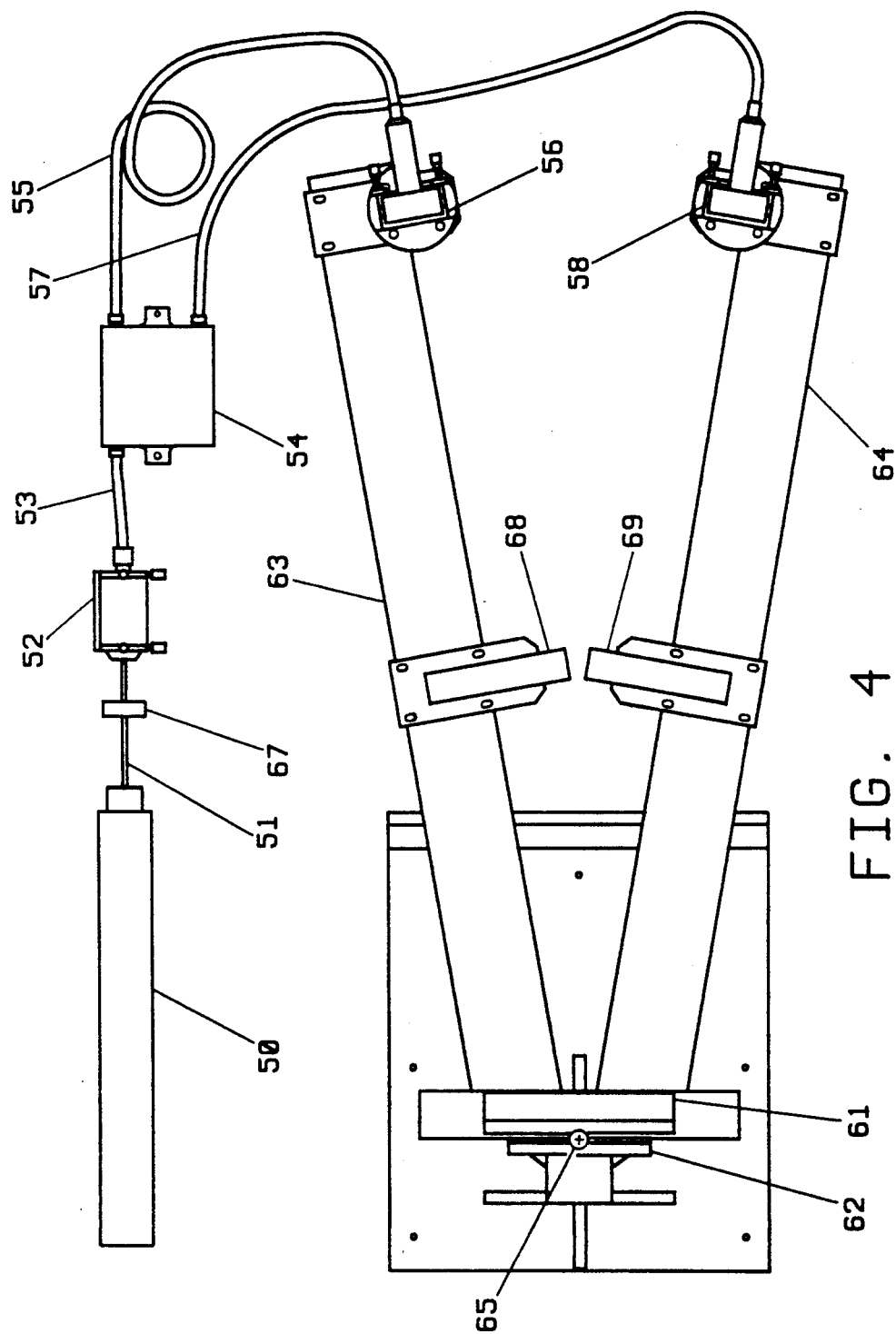
FIG. 4 is a schematic diagram of an alternate embodiment of the present invention, showing collimating lenses directing mutually coherent beams to create interference fringes.

FIG. 4 is a schematic diagram of an alternate embodiment of the present invention, showing collimating lenses directing mutually coherent beams to create interference fringes. The output end of optical fiber 55 is mounted on fiber mount 56 so as to direct its output light beam at collimating lens 68, and the output end of optical fiber 57 is mounted on fiber mount 58 so as to direct its output light beam at collimating lens 69. Collimating lenses 68 and 69 transmit the collimated beams through a mask 61 to intersect in the location of a photosensitive plane holder 62, where interference fringes result and expose the photographic plate.

The benefits derived from use of the present invention are significant. Most importantly, because there is a fixed relationship between the fiber ends, the collimating mirrors and the region of intersection, the collimated beams will always intersect at the position of the photosensitive plate, and the angle of intersection of the collimated beams can be altered at will without disturbing the spatial filtering, collimation or beam quality, making the invention particularly useful for the manufacture of specialized diffraction gratings.

In addition, the use of fiber optics for transmission and splitting of the laser beam virtually eliminates alignment problems in the spatial filtering, and splitting of the primary beam; movement of the fiber is immaterial as long as the positions of the fiber ends relative to other optical components is maintained. The use of fiber optics also permits remote location of the laser, reducing vibration due to coolant flow.

Finally, the present invention can be made very compact for storage and transport by detaching the laser 50 and folding in the optical rails 63 and 64. When this is done the device will occupy a space which is only 16×46×12 inches. The device can be rapidly set up; the only realignment necessary is that between the laser and the laser-to-fiber optic coupler 52.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

The embodiments of this invention in which an exclusive property of privilege is claimed are defined as follows:

1. An apparatus for the manufacture of diffraction gratings comprised of:
    a source of a beam of coherent light,
    coupling means for coupling said beam of coherent light into a polarization maintaining, single mode optical fiber,
    beam splitting means for splitting said beam of coherent light from said optical fiber into at least two beams of mutually coherent light,
    collimating means, directing said mutually coherent beams onto a point of intersection at which is located a substrate coated with light sensitive material, and
    means for fixing said beam splitting means in relation to said collimating means and in relation to said point of intersection so that alteration of the angle between said collimated beams will not alter the position of said point of intersection.

2. The apparatus of claim 1 wherein said source of a beam of coherent light is a laser.

3. The apparatus of claim 1 wherein said beam splitting means is a fiber optic evanescent wave beam splitter or coupler.

4. The apparatus of claim 2 wherein said laser is mounted remotely.

5. The apparatus of claim 1 wherein said collimating means is a pair of off-axis parabolic mirrors.

6. The apparatus of claim 1 wherein said collimating means is a pair of on-axis parabolic mirrors.

7. The apparatus of claim 1 wherein said collimating means is a pair of spherical mirrors.

8. The apparatus of claim 1 wherein said collimating means is a pair of collimating lenses.

9. The apparatus of claim 1 wherein said collimating means is a collimating lens and a flat mirror.

10. A method for forming a diffraction grating by a holographic exposure process which includes the steps of:
    providing from a source a beam of coherent light,
    coupling said beam to a polarization maintaining, single mode optical fiber, connecting said polarization maintaining single mode optical fiber to a fiber optic evanescent wave beam splitter, using said fiber optic beam splitter, splitting said beam of coherent rays into at least two mutually coherent beams, and using collimating means, directing said mutually coherent beams along respective different paths and causing them to intersect at a given region, locating a surface coated with light sensitive material in the said given region of intersection of said mutually coherent beams so as to record interference fringes produces by the intersection of said mutually coherent beams in said given region, and fixing said fiber optic beam splitter in relation to said collimating means and in relation to said point of intersection so that alteration of the angle between said collimated beams will not alter the position of said given region.

11. The method of claim 10 wherein said source of a beam of coherent light is a laser.

12. The apparatus of claim 1 wherein said means for fixing said beam splitting means in relation to said collimating beams and in relation to said point of intersection are optical rails which rotate about a common axis at the point of intersection.

* * * * *